United States Patent

Shirota et al.

[11] Patent Number: 5,118,351
[45] Date of Patent: Jun. 2, 1992

[54] INK, INK-JET RECORDING PROCESS, AND INSTRUMENT USING THE INK

[75] Inventors: Koromo Shirota, Kawasaki; Kyoko Fukushima; Shoji Koike, both of Yokohama, all of Japan

[73] Assignee: Canon Kabushiki Kaisha, Tokyo, Japan

[21] Appl. No.: 662,948

[22] Filed: Mar. 1, 1991

[30] Foreign Application Priority Data

Mar. 7, 1990 [JP] Japan ........................... 2-57595
Jan. 23, 1991 [JP] Japan ........................... 3-6398

[51] Int. Cl.$^5$ ............................................. C09D 11/02
[52] U.S. Cl. ............................................. 106/22; 106/20
[58] Field of Search ................................. 106/20, 22

[56] References Cited

U.S. PATENT DOCUMENTS

| | | | |
|---|---|---|---|
| 4,176,361 | 11/1979 | Kawada et al. | 106/22 |
| 4,285,727 | 8/1981 | Uehara et al. | 106/22 |
| 4,381,946 | 5/1983 | Uehara et al. | 106/22 |
| 4,620,876 | 11/1986 | Fujii et al. | 106/22 |
| 4,683,002 | 7/1987 | Mirva et al. | 106/22 |
| 4,732,613 | 3/1988 | Shioya et al. | 106/22 |
| 4,765,838 | 8/1988 | Ohata et al. | 106/22 |

FOREIGN PATENT DOCUMENTS

| | | |
|---|---|---|
| 54-59936 | 5/1979 | Japan . |
| 55-29546 | 3/1980 | Japan . |
| 56-57862 | 5/1981 | Japan . |
| 56-145961 | 11/1981 | Japan . |
| 56-145962 | 11/1981 | Japan . |
| 195019 | 8/1989 | Japan . |
| 1195019 | 8/1989 | Japan . |
| 2269094 | 11/1990 | Japan . |
| 2038862 | 7/1980 | United Kingdom . |

Primary Examiner—William R. Dixon, Jr.
Assistant Examiner—Helene Klemanski
Attorney, Agent, or Firm—Fitzpatrick, Cella, Harper & Scinto

[57] ABSTRACT

Provided is an ink comprising a recording agent and a liquid medium capable of dissolving or dispersing the recording agent, wherein said ink comprises from 0.1% to 10% by weight of a water-soluble dye, from 75% to 95% by weight of water and from 4% to 20% by weight of a mixture of 1,2,6-hexanetriol and an addition polymer of ethylene oxide.

5 Claims, 3 Drawing Sheets

INK, INK-JET RECORDING PROCESS, AND INSTRUMENT USING THE INK

BACKGROUND OF THE INVENTION

1. Field of the Invention

The present invention relates to an ink, an ink-jet recording process, and an instrument making use of the ink. More particularly it relates to an ink, an ink-jet recording process, a recording unit, an ink-jet recording apparatus and an ink cartridge that are capable of achieving highly detailed and high-image quality recording not only on coated paper specially prepared for ink-jet recording but also on non-coated paper such as paper for copying, paper for reporting, bond paper or continuous slip paper, i.e., what is called a plain paper, commonly used in offices and homes, and also are suitable for a high-frequency drive ink-jet recording system that utilizes heat energy.

2. Related Background Art

Inks with greatly various manners of being composed have been hitherto reported in respect of inks for an ink-jet recording. In particular, in recent years, detailed research and developments have been made from various approaches such as composition and physical properties so that a good record can be made even on a plain paper such as paper for copying, paper for reporting, notepaper or letter paper, commonly used in offices.

In regard to an ink-jet recording also, various methods have been proposed, including a method in which electrically charged droplets are continuously generated so that a part of the droplets is used in recording, a method in which signals are imparted to a recording head having a piezoelectric device and droplets of a recording solution are generated in accordance with the signals to carry out recording, and a method in which heat energy corresponding with a recording signal is applied to a recording solution held in a chamber of a recording head and droplets are generated by the action of this energy to carry out recording.

In particular, the ink-jet recording of the type the ink is ejected utilizing a phenomenon of ink bubbling caused by heat energy, as disclosed in Japanese Patent Application Laid-open No. 54-59936, facilitates higher integration and higher densification of nozzles, and is a method that has recently attracted particular notice. However, because of the utilization of the phenomenon of bubbling, which is not utilized in other methods, this method requires more strict conditions with respect to the ink used.

Preferable conditions for the ink used in this method can be enumerated as follows:

(1) The ink has a good bubbling response to the heat energy, so that droplets can be always stably ejected from minute ejection orifices to cause no clogging.

(2) Even if a printer has been left in an uncapped state when the recording is in a pause, the ink can be stably ejected immediately after the recording is restarted. In other words, the ink in the vicinity of the ejection orifices is not easily dried, so that no clogging occurs.

(3) An image with a high quality level, free from irregular feathering can be formed, in particular, on plain paper.

(4) Print can be quickly fixed (or dried) on plain paper, and hence may not be smeared even when rubbed.

(5) The ink has a good storage stability, and the performances of ink can be maintained over a long period of time.

(6) The ink is excellent in safety such as non-toxicity and non-inflammability.

To cope with these requirements, various manners of formulation of ink have been hitherto proposed, without any particular limitation to the heat energy type in regard to the manner of ejection. For example, inks usually contain high-boiling organic solvents such as glycols for the purposes of anti-drying, anti-clogging and so forth. When recording is carried out using such inks on a plain paper having a high degree of sizing, ink does not readily penetrate into the paper and the part on which a record has been made does not dry well, so that when recorded characters or the like are touched, the hand may be stained with ink or the characters become smeared. Thus, there have been problems.

Under such circumstances, in order to increase the penetrability of ink into paper, Japanese Patent Application Laid-open No. 55-29546 proposes a method in which a surface active agent is added in ink in a large quantity. In such an instance, the following troubles have been caused: feathering occurs very frequently on some kind of paper; when filled ian ink-jet recording head, the ink recedes from the orifice surface depending on the structural conditions of the head, resulting in no ejection of ink, or on the other hand the whole of the orifice surface becomes wet, also resulting in no ejection of ink.

Japanese Patent Application Laid-open No. 56-57862 also proposes a method in which the pH of ink is set to the alkaline side. In this instance, however, there are disadvantages such that the ink is harmful when touched with hands or that poor results or obtained in view of both feathering and drying performance when the ink is used on a paper containing a certain kind of sizing agent, e.g., a neutralized paper.

Besides the foregoing, various improvements have been attempted. Up to the present, however, no ink is known which can resolve all the above problems of feathering, drying performance and safety of ink, and also the problem of clogging, even if there is no limitation that the ink is used in the heat energy type recording. In addition, it is very important, but very difficult, to design an ink that can further be capable of responding under a high frequency the phenomenon of bubbling, which is peculiar to the heat energy type recording.

SUMMARY OF THE INVENTION

Accordingly, an object of the present invention is to provide an ink that can achieve a good bubbling response to heat energy in high-frequency drive, has resolved the problems of feathering and the drying retardation of printed characters or the like, occurring when recording is carried out on non-coated paper such as paper for copying, paper for reporting, notepaper or letter paper. i.e., what is called a plain paper commonly used in offices; and to provide an ink-jet recording process and an instrument making use of the ink.

Another object of the present invention is to provide an ink for ink-jet recording, having a high degree of safety even when used in offices and homes.

Still another object of the present invention is to provide an ink that is not liable to cause clogging at the nozzles of a head for ink-jet recording, and also has a good reliability; and to provide an instrument making use of the ink.

The above objects of the present invention can be achieved by the present invention described below. The present invention provides an ink comprising a recording agent and a liquid medium capable of dissolving or dispersing the recording agent, wherein said ink contains from 0.1% to 10% by weight of a water-soluble dye, from 75% to 95% by weight of water and from 4% to 20% by weight of a mixture of 1,2,6-hexanetriol and an addition polymer of ethylene oxide.

The present invention also provides an ink-jet recording process comprising ejecting ink droplets from an orifice in accordance with a recording signal to make a record on a recording medium, wherein the ink as described above is used.

The present invention still also provides a recording unit comprising an ink container portion that holds an ink and a head from which the ink is ejected in the form of ink droplets, wherein the ink as described above is used.

The present invention further provides an ink cartridge comprising an ink container portion that holds an ink, wherein the ink as described above is used.

The present invention still further provides an ink-jet recording apparatus comprising a recording unit comprising an ink container portion that holds an ink and a head from which the ink is ejected in the form Of ink droplets, wherein the ink as described above is used.

The present invention still further provides an ink-jet recording apparatus comprising a recording head from which ink droplets ere ejected, an ink cartridge having an ink container portion that has held an ink, and an ink feeder that feeds ink from said ink cartridge to said recording head, wherein the ink as described above is used.

DESCRIPTION OF THE PREFERRED EMBODIMENTS

Figure 1A:
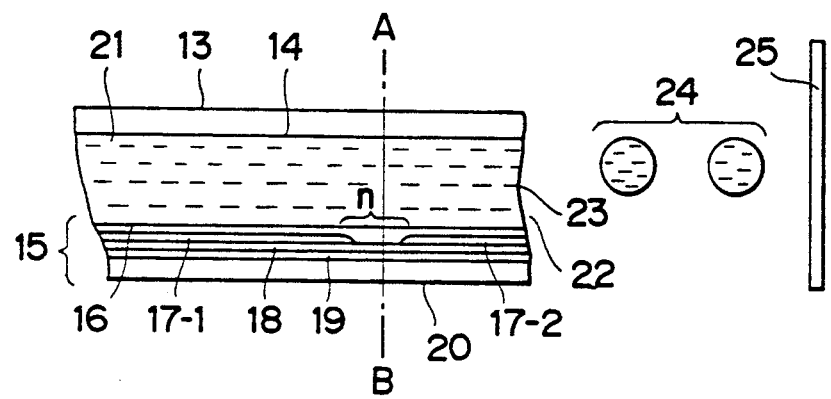
FIGS. 1A and 1B illustrate a longitudinal vertical cross section and a transverse cross section, respectively, of a head of an ink-jet recording apparatus.

The present inventors have made intensive studies on various manners of ink composition with good reliability, that is suitable for a high-frequency drive recording system in which ink is ejected utilizing a phenomenon of ink bubbling caused by heat energy, can improve anti-feathering, drying performance and penetrability of ink on plain paper, and also is not liable to cause clogging at the nozzles of a head for ink-jet recording. As a result, they have discovered that an ink comprising a liquid medium comprised of a combination of from 75% to 95% by weight of water and from 4% to 20% by weight of a mixture of 1,2,6-hexanetriol end an addition polymer of ethylene oxide can be well balanced in anti-feathering and penetrability and also can achieve particularly good anti-clogging. Thus they have accomplished the present invention.

According to what is known by the present inventors, as conventional agents for preventing inks from causing clogging, an ethylene oxide addition polymer and glycerol have been used, among which glycerol has been used as a particularly preferred anti-clogging agent because it can prevent clogging by its addition in a relatively small quantity and also is not liable to cause feathering on the surface of paper. Glycerol, however, has a poor wettability to a sizing agent present in paper and therefore has the disadvantage that it gives a poor ink drying performance or penetrability on the surface of some kind of paper.

As for the addition polymer of ethylene oxide, it can have an anti-clogging effect, but has a reasonably poorer effect on the problem of feathering than glycerol and also has no penetrability on a sufficiently high level, though a little better than glycerol.

On the other hand, the mixture of 1,2,6-hexanetriol and an addition polymer of ethylene oxide as used in the present invention not only can improve the anti-clogging performance than those which are respectively used alone but also has a performance substantially comparable to glycerol in respect of the feathering. In respect of the penetrability also, it has achieved an improvement up to the level that has been unachievable at all by conventional anti-clogging agents.

The cooperative effect attributable to the blending of these compounds is considered to require detailed analyses on the structural theory concerning solutions formed through hydrogen bonds, and no clear reason therefor has been found. It, however, can be presumed that& a good behavior can be exhibited against feathering because of a very strong bonding force between solvent molecules and at the same time, the affinity for a sizing agent added to paper present on the surface and interior thereof, can be given in a miraculous balance for a plain paper-adapted ink-jet ink because of the mixing of different solvent molecules, so that the penetrability also can be well exhibited.

As for the reason why the response to bubbling can be markedly improved, it can be presumed that, when the materials used in the ink of the present invention are mixed in a given proportion, the properties of ink and the wettability thereof to the members constituting the interior of nozzles become most suited to the recording method in which ink is ejected utilizing a phenomenon of ink bubbling caused by heat energy.

The components of the ink of the present invention will be described below.

What is used in the present invention and mainly characterizes the present invention is the mixture of 1,2,6-hexanetriol and an addition polymer of ethylene oxide, used as a water-soluble solvent.

These materials should be mixed in a proportion of from 1:20 to 20:1, preferably from 1:10 to 10:1 and more preferably from 1:5 to 5:1, in weight ratio.

The addition polymer of ethylene oxide may include an ethylene oxide with a degree of polymerization of from 2 to 20, and preferably from 2 to 10. It may more preferably be triethylene glycol.

The mixture as described above may be added to the ink in an amount of from 4% to 20% by weight, preferably from 6% to 18% by weight, and more preferably from 8% to 16% by weight, which may vary depending on dyes used and other liquid medium components used in combination.

An amount of the above mixture less than 4% by weight may bring about no anti-clogging effect, and an amount more than 20% by weight may result in a deterioration of anti-feathering and penetrability.

The water-soluble dye that constitutes the ink of the present invention may include direct dyes, acid dyes, food dyes, basic dyes, reactive dyes and soluble vat dyes.

Yellow dyes include, for example, C.I. Direct Yellow 12, 24, 26, 44, 86, 98, 100, 142; C.I. Acid Yellow 11, 17, 23, 25, 29, 42, 49, 61, 71; and C.I. Reactive Yellow 2, 3, 13, 15, 17, 18, 23, 24, 37, 42, 57, 58, 64, 75, 76, 77, 79, 81, 84, 85, 87, 88, 91, 92, 93, 95, 102, 111, 115, 116, 130, 131, 132, 133, 135, 136, 137, 139, 140, 142, 143, 144, 145, 146, 147, 148, 151, 162, 163. In particular, C.I. Direct Yellow 86 or 142 is preferred.

Cyan dyes include, for example, C.I. Direct Blue 6, 22, 25, 71, 86, 90, 106, 199; C.I. Acid Blue 9, 22, 40, 59, 93, 102, 104, 113, 117, 120, 167, 229, 234, 254 and C.I. Reactive Blue 2, 3, 5, 8, 10, 13, 14, 15, 18, 19, 21, 25, 27, 28, 38, 39, 40, 41, 49, 52, 63, 71, 72, 74, 75, 77, 78, 79, 89, 100, 101, 104, 105, 119, 122, 147, 158, 160, 162, 166, 169, 170, 171, 172, 173, 174, 176, 179, 184, 190, 191, 194, 195, 198, 204, 211, 216, 217. In particular, C.I. Direct Blue 86 or 199 is preferred.

Magenta dyes include, for example, C.I. Direct Red 1, 4, 17, 28, 83; C.I. Acid Red 1, 6, 8, 32, 35, 37, 51, 52, 80, 85, 87, 92, 94, 115, 180, 256, 317, 315; and C.I. Reactive Red 3, 13, 16, 21, 22, 23, 24, 29, 31, 33, 35, 45, 49, 55, 63, 85, 106, 109, 111, 112, 113, 114, 118, 126, 128, 130, 131, 141, 151, 170, 171, 174, 176, 177, 183, 184, 186, 187, 188, 190, 193, 194, 195, 196, 200, 201, 202, 204, 206, 218, 221. In particular, a dye represented by the following Formula (III) is preferred:

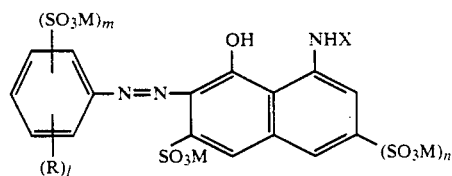

wherein represents a hydrogen atom, a lower alkyl group, a lower alkoxyl group, a lower acylamino group, a nitro group or a halogen atom; X represents an acetyl group, a benzoyl group, a paratoluenesulfonyl group or a 4-chloro-6-hydroxy-1,3,5-triazin-2-yl group; M represents an alkali metal, an ammonium, group or an organic amine group; l represents 0 to 2 and m and n each represent 0 or 1.

Examples thereof are shown below:

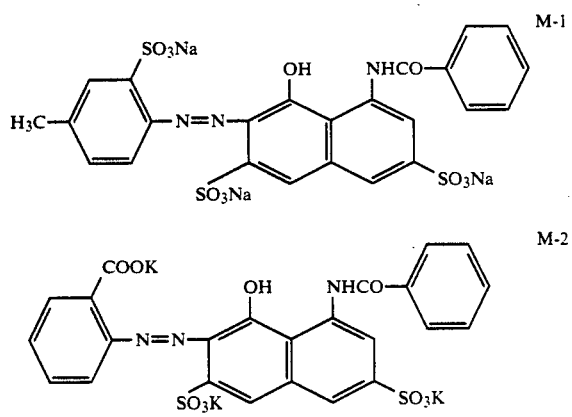

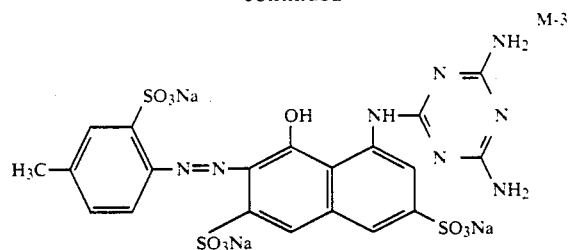

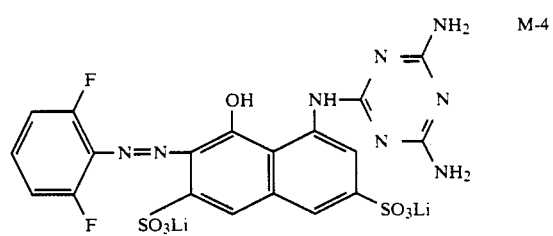

Black dyes include, for example, C.I. Direct Black 17, 19, 32, 51, 62, 71, 108, 146, 154, 168; C.I. Acid Black 2, 7, 24, 26, 31, 52, 63, 112, 118; C.I. Reactive Black 1, 5, 8, 13, 14, 23, 31, 34, 39; and C.I. Food Black 1, 2. In particular, C.I. Food Black 2 and dyes represented respectively by the following Formulas (I) and (II) are preferred:

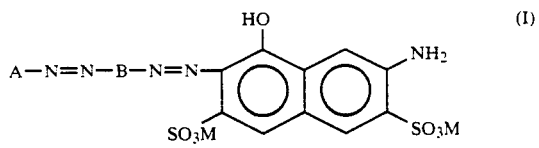

wherein A represents a lower alkylcarbonylamino group, a lower alkoxyl group, an $SO_3M$ group, a phenyl group substituted by a phenylazo group which may be substituted by an $SO_3M$ group, or a naphthyl group substituted by an $SO_3M$ group; B represents a naphthyl group substituted by an $SO_3M$ group or a phenyl group substituted by a lower alkoxyl group; and M represents an alkali metal or an ammonium group.

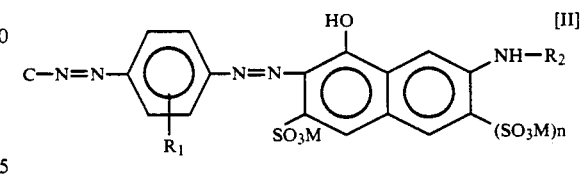

wherein C represents a naphthyl group substituted with an $SO_3M$ group, a phenylazo group which may be substituted by an $SO_3M$ group, or a phenyl group substituted by a lower alkyl group, a lower alkoxyl group or a lower alkylcarbonylamino group; $R_1$ represents a lower alkyl group, a lower alkoxyl group or a lower alkylcarbonylamino group; $R_2$ represents a hydrogen atom, or a phenyl group substituted by an $SO_3M$ group; n represents 0 or 1; and M represents an alkali metal or an ammonium group.

Examples thereof are shown below.

Examples of structural formula in Formula (I):
Bk-1:
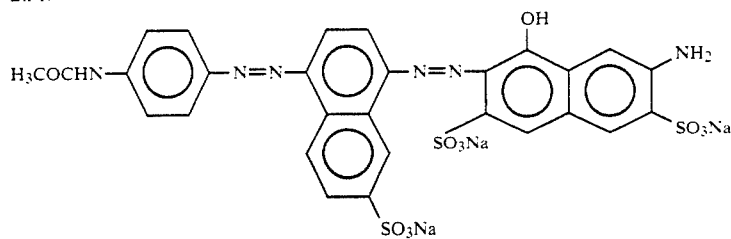
Bk-2:
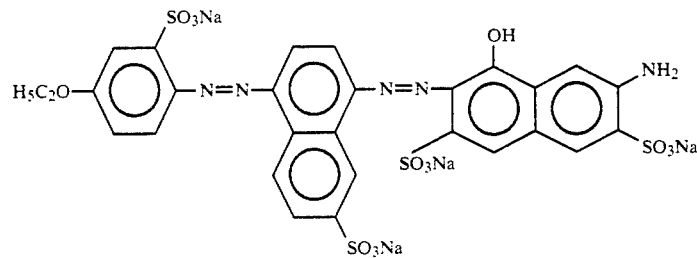
Bk-3:
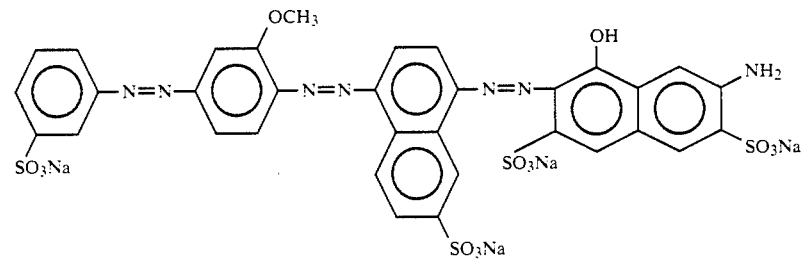
Bk-4:
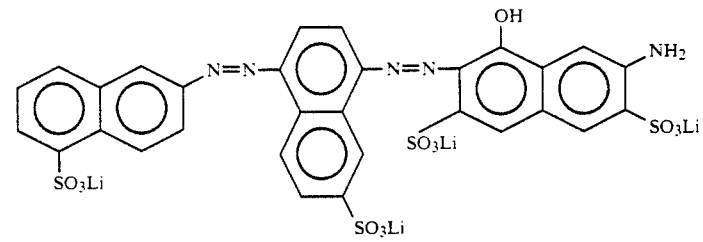
Bk-5:
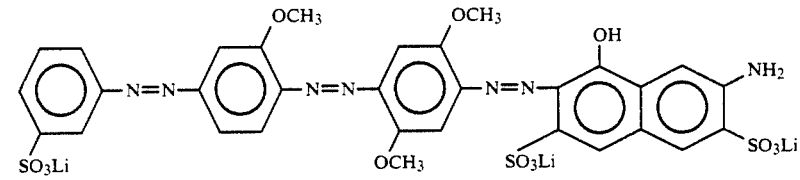
Bk-6:
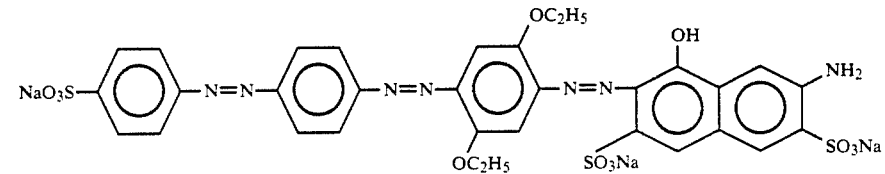
Examples of structural formula in Formula (II):
Bk-7:

-continued

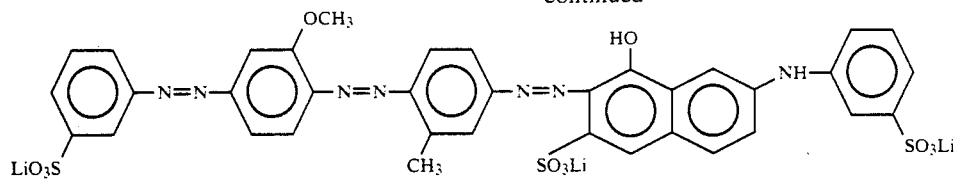

Bk-8:

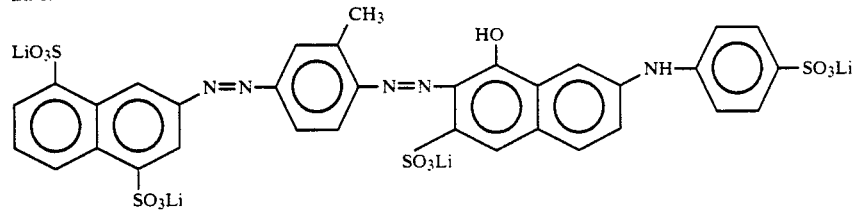

Bk-9:

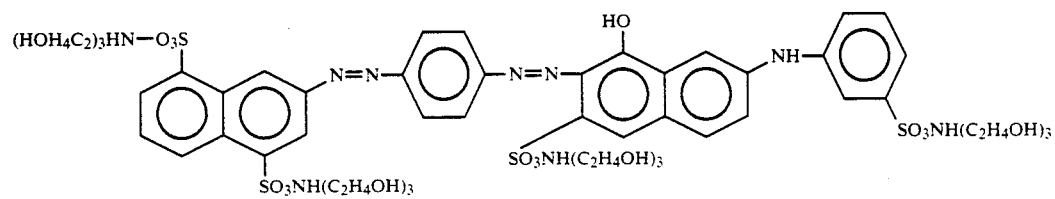

Bk-10:

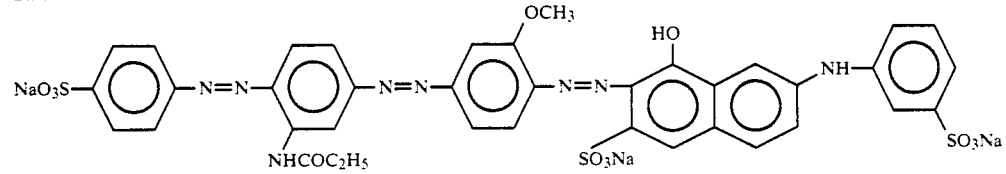

Bk-11:

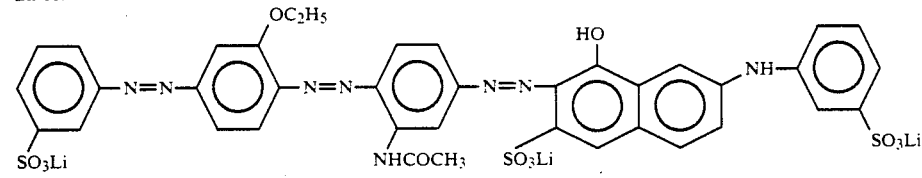

Bk-12:

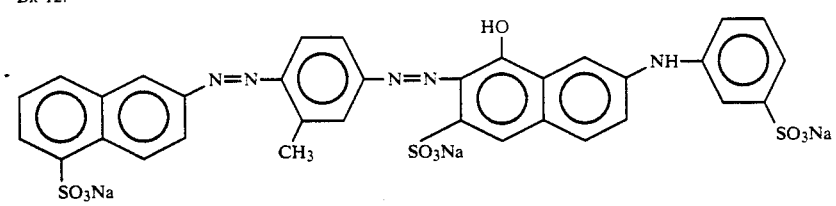

The amount of any of these water-soluble dyes contained depends on the types of liquid medium components, the properties required in inks, etc. In general, the dye may be contained in an amount of approximately from 0.1% to 10% by weight, preferably from 0.5% to 8% by weight, and more preferably from 1% to 5% by weight.

The water, which is an essential component of the ink of the present invention, may be contained in the ink in an amount of from 75% to 95% by weight, preferably from 78% to 92% by weight, and more preferably from 80% to 90% by weight. An amount of water less than 75% by weight results in an excessively large quantity of organic solvent to cause curling of paper or a serious deterioration of the quality level of print on a plain paper or the like. An amount of water more than 95% by weight may result in serious deterioration of the stability of ejection from orifices of nozzles.

The essential components of the ink of the present invention are as described above. It is possible to use a monohydric alcohol in combination. It enables more improvement in the pentrability and the response to heat energy while suppressing irregular feathering.

The monohydric alcohol that can be used specifically includes aliphatic monohydric alcohols, and preferably aliphatic monohydric alcohols having 2 to 5 carbon atoms.

The amount of the alcohols added varies depending on their types. It may be in the range of from 0.1% to 10% by weight, and more preferably from 0.5% to 5% by weight. A content of the alcohol less than 0.1% by weight gives less effect in the response to heat energy and the penetrability of ink. On the other hand, a content thereof more than 10% by weight may cause irregular feathering on some kind of paper, resulting in a serious deterioration of image quality.

Other usual organic solvents used in conventionally known inks can also be used so long as they can be used without hindrance. For example, such organic solvents include amides such as dimethylformamide and dimethylacetamide; ketones or ketoalcohols such as acetone and diacetone alcohol; ethers such as tetrahydrofuran and dioxane; oxypropylene addition polymers such as dipropylene glycol, tripropylene glycol and polypropylene glycol; alkylene glycols whose alkylene group has 2 to 6 carbon atoms, such as ethylene glycol, propylene glycol, trimethylene glycol, butylene glycol and hexylene glycol; thiodiglycol; glycerol; lower alkyl ethers of polyhydric alcohols, such as ethylene glycol monomethyl or -ethyl ether, diethylene glycol monomethyl or -ethyl ether and triethylene glycol monomethyl or -ethyl ether: lower dialkyl ethers of polyhydric alcohols, such as triethylene glycol demethyl or -ethyl ether and tetraethylene glycol dimethyl or -ethyl ether; sulfolane, N-methyl-2-pyrrolidone, and 1,3-dimethyl-2-imidazolidinone.

The above water-soluble organic solvent may be contained in an amount ranging from 1% to 15% by weight, and preferably from 1% to 10% by weight, based on the total weight of the ink.

Other various kinds of dispersant, surface active agent, viscosity modifier, surface tension modifier, fluorescent brightening agent and so forth may optionally be added.

For example, they include viscosity modifiers such as polyvinyl alcohol, celluloses and water-soluble resins: all sorts of surface active agents of a cationic, anionic or nonionic type; surface tension modifiers such as diethanolamine and triethanolamine: pH adjusters comprising a buffer; and mildewproofing agents.

The ink of the present invention can settle the problems concerning the feathering, the drying performance of recorded characters or the like and the penetrability, arising when recording is carried out on plain paper or the like. At the same time, it can match the recording head in an improved state. From these viewpoints, the physical properties of the ink should be controlled to give a surface tension of from 30 dyne/cm to 68 dyne/cm at 25° C. and a viscosity of not more than 10 cP, preferably not more than 5 cP, and more preferably not more than 3 cP.

The constitution and physical properties of the ink of the present invention have been described above. In a most preferred manner of use, the ink may preferably be used in heat energy type recording, particularly in the method according to, in principle, what is disclosed in Japanese Patent Application Laid-open No. 54-59936. Its drive frequency may be 3.5 KHz or higher, preferably in the range of from 4 KHz to 20 KHz, and more preferably from 4.5 KHz to 10 KHz. The bubbling response of the ink of the present invention can be more clearly significant when the ink is used in the printing carried out at a drive frequency of 3.5 KHz or higher.

The ink of the present invention can be particularly preferably used in the ink-jet recording in which recording is carried out by ejecting ink droplets by an action of heat energy. Needless to say, it can also be used for usual writing implements.

The method and apparatus suited to carry out recording by the use of the ink of the present invention may include a method and apparatus in which a heat energy corresponding with a recording signal is imparted to the ink held in the interior of a recording head so that ink droplets are generated by an action of the heat energy.

Figure 1B:
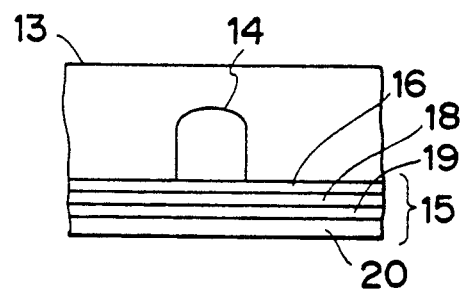

FIGS. 1A and 1B show an example of the construction of the head, which is a main component of the apparatus.

A head 13 is formed by bonding a glass, ceramic or plastic plate or the like having a groove 14 through which ink is passed, to a heating head 15 used in thermal recording (the drawing shows a head, to which, however, is not limited). The heating head 15 is constituted of a protection layer 16 formed of silicon oxide or the like, a heating resistor layer 18 formed of aluminum electrodes 17-1 and 17-2, nichrome and so forth, a heat accumulating layer 19, and a substrate plate 20 with a good heat dissipation property.

The ink 21 reaches an ejection orifice 22 (a minute opening) and a meniscus 23 is formed there by a pressure P.

Figure 2:
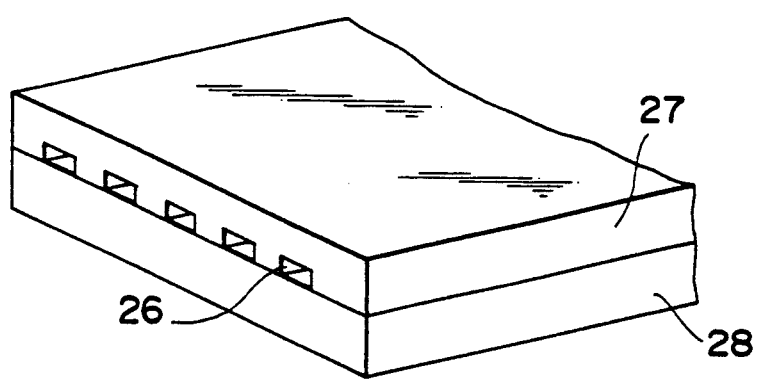
FIG. 2 is a perspective illustration of the appearance of a head comprised of a multiple set of the head as shown in FIGS. 1A and 1B.

Now, upon application of electric signals to the electrodes 17-1 and 17-2, heat is abruptly generated at the region denoted by n in the heating head 15, so that bubbles are generated in the ink 21 coming into contact with this region. The pressure thus produced thrusts out the meniscus 23 and the ink 21 is ejected from the orifice 22 in the form of recording droplets 24 to fly against a recording medium 25. FIG. 2 illustrates a multi-head comprising the head as shown in FIG. 1A arranged in a large number. The multi-head is prepared by closely adhering a glass plate 27 having multi-grooves 26, to a heating head 28 similar to the head as illustrated in FIG. 1A.

FIG. 1A is a cross-sectional view of the head 13 along its ink flow path, and FIG. 1B is a cross-sectional view along the line A-B in FIG. 1A.

Figure 3:
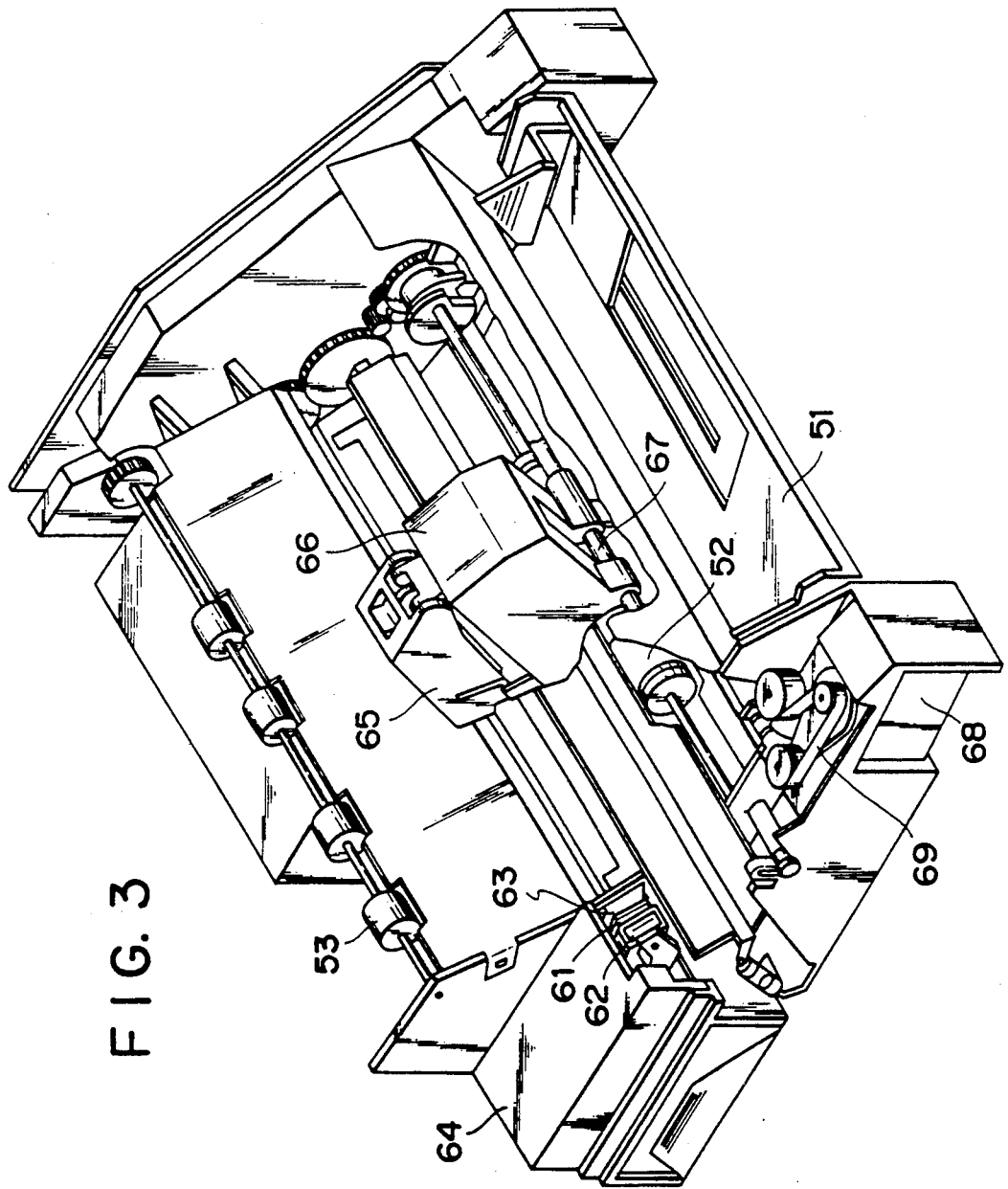
FIG. 3 is a perspective illustration of an example of ink-jet recording apparatus.

FIG. 3 shows an example of an ink-jet recording apparatus in which such a head has been incorporated.

In FIG. 3, reference numeral 61 denotes a blade serving as a wiping member, one end of which is a stationary end retained by a blade-retaining member. The blade 61 is provided at the position adjacent to the region in which a recording head makes a record. In the present example, the blade is retained in such a form that it protrudes to the course through which the recording head is moved. Reference numeral 62 denotes a cap, which is provided at the home position adjacent to the blade 61, and is so constituted that it moves in the direction perpendicular to the direction in which the recording head is moved and comes into contact with the face of ejection openings to carry out capping. Reference numeral 63 denotes an ink absorption member provided adjoiningly to the blade 61, and, similar to the blade 61, is retained into such a form that it protrudes to the course through which the recording head is moved. The above blade 61, cap 62 and ink absorption member 63 constitute an ejection-recovery portion 64, where the blade 61 and the ink absorption member 63 remove water, dust or the like from the ink ejection opening face.

Reference numeral 65 denotes the recording head having an ejection energy generating means and ejects ink to the recording medium set opposingly to the ejection opening face provided with ejection openings, to carry out recording. Reference numeral 66 denotes a carriage on which the recording heed 65 is mounted so that the recording head 65 can be moved. The carriage 66 is slideably associated with a guide rod 67. A part of the carriage 66 is connected (not shown) with a belt 69 drived by a motor 68. Thus, the carriage 66 can be moved along the guide rod 67 and hence the recording head 65 can be moved from a recording region to a region adjacent whereto.

Reference numeral 51 denotes a paper feeding part from which recording mediums are inserted, and 52, a paper feed roller driven by a motor (not shown). With such construction, the recording medium is fed to the position opposing to the ejection opening face of the recording head, and, with progress of recording, outputted from a paper output section provided with a paper output roller 53.

In the above constitution, the cap 62 of the ejection-recovery portion 64 is receded from the moving course of the recording head 65 when the recording head 65 is returned to its home position, e.g., after completion of recording, and the blade 61 stands protruded to the moving course. As a result, the ejection opening face of the recording head 65 is wiped. When the cap 62 comes into contact with the ejection opening face of the recording head 65 to carry out capping, the cap 62 is moved in such a way that it protrudes to the moving course of the recording head.

When the recording head 65 is moved from it home position to the position at which recording is started, the cap 62 and the blade 61 are at the same position as the position where the ejection opening face is wiped. As a result, the ejection opening face of the recording head 65 is wiped also at the time of this movement.

The above movement of the recording heat to its home position is made not only at the time of the completion of recording or restoration of ejection, but also when the recording head is moved between recording regions for the purpose of recording, during which it is moved to the home position adjacent to each recording region at given intervals, where the ejection opening face is wiped in accordance with this movement.

Figure 4:
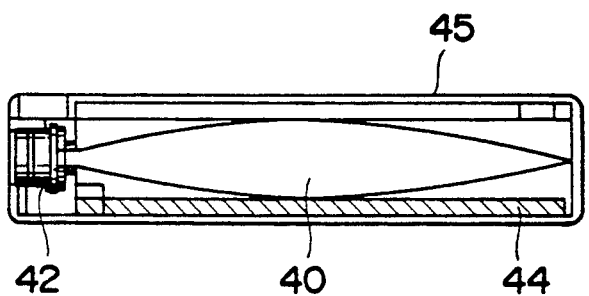
FIG. 4 is a longitudinal cross-sectional illustration of an ink cartridge.

FIG. 4 shows an example of an ink cartridge, denoted as 45, that holds the ink being fed to the head through an ink-feeding member as exemplified by a tube (not shown). Herein reference numeral 40 denotes an ink container portion that holds the feeding ink, as exemplified by an ink bag. The top thereof is provided with a stopper 42 made of rubber. A needle (not shown) may be inserted to this stopper 42 so that the ink in the ink container portion 40 can be fed to the head. Reference numeral 44 denotes an absorption member that receives waste ink.

It is preferred in the present invention that the ink holder is formed of a polyolefin, in particular, polyethylene, at its surface with which the ink comes into contact.

Figure 5:
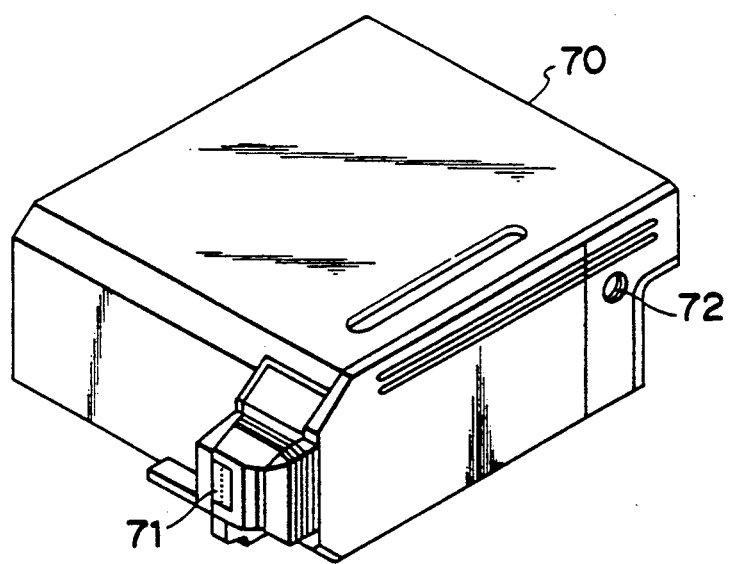
FIG. 5 is a perspective illustration of a recording unit.

The ink-jet recording apparatus used in the present invention may not be limited to the apparatus as described above in which the head and the ink cartridge are separately provided, and a device can also be preferably used in which these are integrally formed as shown in FIG. 5.

In FIG. 5, reference numeral 70 denotes a recording unit, in the interior of which an ink container portion that holds an ink, as exemplified by an ink absorption member, is contained. The recording unit is so constructed that the ink in such an ink absorption member is ejected in the form of ink droplets from a head 71 having a plurality of orifices. As a material for the ink absorption member, it is preferred in the present invention to use polyurethane.

Reference numeral 72 denotes an air path opening through which the interior of the recording unit is made to communicate with the atmosphere.

This recording unit 70 can be used in place of the recording head shown in FIG. 3, and is detachably mounted to the carriage 66.

The present invention will be described below in a more specific manner by giving Examples and Comparative Examples. In the following, "part(s)" and "%" are by weight unless particularly noted.

EXAMPLES 1 TO 6

The respective components as shown below were mixed and stirred for 5 hours. Thereafter, the resulting solution was adjusted to have a pH value of 7.5 with an aqueous 0.1% sodium hydroxide solution and then subjected to pressure filtration using a membrane filter of 0.22 $\mu$m in pore size. Inks A to F of the present invention were thus obtained.

Next, recording was carried out using the resulting inks A to F and also using as an ink-jet recording apparatus the ink-jet printer BJ-130 (trade name: manufactured by Canon Inc.) with a heater element as an energy source for the ejection of ink, modified to a drive frequency of 4.5 KHz. The recording was carried out on commercially available paper for copying and bond paper to evaluate the fixing performance of recorded characters, the feathering occurrence, the anti-clogging when printing is re-started after a pause of printing, the anti-clogging when printing is re-started after a long-term stop of printing, and the frequency response. Results obtained are shown in Table 1. Tests for the evaluation were usually carried out under conditions of 25° C. and 60% RH.

| Ink A: | |
|---|---|
| C.I. Food Black 2 | 3 parts |
| 1,2,6-Hexanetriol | 4 parts |
| Diethylene glycol | 10 parts |
| Water | 83 parts |
| Ink B: | |
| C.I. Food Black 2 | 1 part |
| Dye of structural formula Bk-4 | 1 part |
| Dye of structural formula Bk-6 | 1 part |
| 1,2,6-Hexanetriol | 6 parts |
| Triethylene glycol | 6 parts |
| n-Butanol | 1.5 parts |
| Water | 83.5 parts |
| Ink C: | |
| Dye of structural formula Bk-2 | 2 parts |
| 1,2,6-Hexanetriol | 5 parts |
| Tetraethylene glycol | 5 parts |
| Isopropanol | 3 parts |
| Water | 85 parts |
| Ink D: | |
| C.I. Direct Yellow 86 | 2 parts |
| 1,2,6-Hexanetriol | 6 parts |
| Triethylene glycol | 3 parts |
| Glycerol | 3 parts |
| Ethanol | 4 parts |
| Water | 82 parts |
| Ink E: | |
| C.I. Acid Red 35 | 2 parts |
| 1,2,6-Hexanetriol | 7 parts |
| Polyethylene glycol (average molecular weight: 300) | 4 parts |
| n-Methyl-2-pyrrolidone | 1 part |
| Triethylene glycol monomethyl ether | 1 part |

-continued

| Ethylene glycol | 2 parts |
|---|---|
| Water | 83 parts |
| Ink F: | |
| C.I. Food Black 2 | 3 parts |
| 1,2,6-Hexanetriol | 6 parts |
| Triethylene glycol | 6 parts |
| n-Butanol | 1.5 part |
| Water | 83.5 parts |

Comparative Examples 1 to 5

Using the components as shown below, inks G to K of Comparative Examples 1 to 5 were obtained in the same manner as in Examples 1 to 6, and the evaluation on every item was made in the same manner as in Examples. Results obtained are shown in Table 1.

| Ink G: | |
|---|---|
| C.I. Food Black 2 | 3 parts |
| 1,2,6-Hexanetriol | 12 parts |
| n-Butanol | 1.5 part |
| Water | 83.5 parts |
| Ink H: | |
| C.I. Food Black 2 | 3 parts |
| Triethylene glycol | 12 parts |
| n-Butanol | 1.5 parts |
| Water | 83.5 parts |
| Ink I: | |
| C.I. Food Black 2 | 2 parts |
| 1,2,6-Hexanetriol | 1 part |
| Triethylene glycol | 1 part |
| Water | 96 parts |
| Ink J: | |
| C.I. Food Black 2 | 3 parts |
| 1,2,6-Hexanetriol | 11 parts |
| Triethylene glycol | 12 parts |
| Water | 74 parts |
| Ink K: | |
| C.I. Direct Black 154 | 2 parts |
| PEG 300 | 14 parts |
| (polyethylene glycol, molecular weight: 300) | |
| Nonionic surface active agent | 0.5 part |
| (trade name: Nissan Nonion P-223; available from Nippon Oil & Fats Co., Ltd.) | |
| Water | 83.5 parts |

No.5C; available from Toyo Roshi K.K.) on lapse of 10 seconds and 30 seconds.
AA: Not blurred when rubbed on lapse of 10 seconds.
A: Slightly blurred when rubbed on lapse of 10 seconds.
B: Slightly blurred when rubbed on lapse of 30 seconds.
C: Greatly blurred when rubbed on lapse of 30 seconds.

(*2) Feathering occurrence

To examine the occurrence of feathering, 300 dots were printed with a printer on commercially available paper for copying and bond paper, in a discontinuous fashion. Thereafter, the printed dots were left to stand for 1 hour or more and then the number of dots on which the feathering occurred was counted through observation with a microscope. The proportion of the count to the total number of the dots was indicated by %.
A: 10% or less
B: 11% to 30%
C: 31% or more (*3) Anti-clogging at the time o: re-printing after pause To evaluate the anti-clogging observed when printing is re-started after a temporary stop of printing, a given ink was charged in the printer, and English characters were continuously printed for 10 minutes and then the printing was stopped. After the printer was left to stand for 10 minutes in an uncapped state, English characters were again printed. The evaluation was made on whether or not there was defective print such as blurred characters or characters with unsharp edges.
A: No defective print is seen on the first and subsequent characters.
B: A part of the first character is blurred or has unsharp edges.
C: The first character can not be printed mt all.

(*4) Anti-clogging at the time of reprinting after long-term stop

To evaluate the anti-clogging observed when printing is re-started after the printing has been stopped for a long period of time, a given ink was charged in the printer, English characters were continuously printed

TABLE 1

| | Example: | | | | | | Comparative Example: | | | | |
|---|---|---|---|---|---|---|---|---|---|---|---|
| | 1 | 2 | 3 | 4 | 5 | 6 | 1 | 2 | 3 | 4 | 5 |
| | | | | | Ink: | | | | | | |
| | A | B | C | D | E | F | G | H | I | J | K |
| Fixing performance: *1) | | | | | | | | | | | |
| Paper for copying | A | AA | AA | AA | A | AA | A | B | A | C | AA |
| Bond paper | AA | AA | AA | AA | AA | AA | A | A | AA | C | AA |
| Feathering occurrence: *2) | | | | | | | | | | | |
| Paper for copying | A | A | A | A | A | A | C | C | A | C | C |
| Bond paper | A | A | A | A | A | A | B | B | A | C | C |
| Anti-clogging at the time of re-printing after pause: *3) | A | A | A | A | A | A | B | B | C | C | C |
| Anti-clogging at the time of re-printing after long-term stop: *4) | A | A | A | A | A | A | B | B | C | A | B |
| Frequency response: *5) | AA | AA | AA | AA | AA | AA | C | B | C | C | B |

*1) Evaluation on fixing performance

Characters were printed on commercially available paper for copying and bond paper, and then the printed characters were rubbed with a filter paper (trade name:

for 10 minutes and then the printing was stopped. After the printer was left to stand for 7 days in an uncapped state, an operation for restoration of nozzles having clogged was carried out. The evaluation was made on the basis of the times of the operation for restoration, carried out until normal printing becomes possible without defective print such as blurred characters or characters with unsharp edges (conditions for standing: 60° C., 10±5% RH).

A: Normal printing is possible after the operation for restoration is carried out once to 5 times.
B: Normal printing is possible after the operation for restoration is carried out 6 to 10 times.
C: Normal printing is possible after the operation for restoration is carried out 12 times or more.

(*5) Evaluation on frequency response

The state Of print obtained by the printing, i.e., defectiveness such as blurred characters or blank areas and defective ink-droplet impact such as splash or slippage were observed with the naked eye to make evaluation.

AA: The ink can be shot under good follow-up to the frequency, so that none of blurred characters, blank areas and defective ink-droplet impact are seen in both solid print and character print.
A: The ink can be shot under substantially good follow-up to the frequency, so that none of blurred characters, blank areas and defective ink-droplet impact are seen in character print, but with slightly blurred in solid print.
B: None of blurred characters and blank areas are seen in character print, but defective ink-droplet impact is partly seen. In solid print, blurred and blank areas are seen in about one-third of the whole of the solid print.
C: A large number of blurred and blank areas are seen in solid print, and a large number of blurred characters and defective ink-droplet impact are also seen in character print.

EXAMPLE 7

Inks L, M and N were prepared in the same way as Ink D of Example 4 except that C.I. Direct Yellow 86 used in Ink D was replaced with the dye of structural formulae M-1, C.I. Direct Blue 199 and the dye of structural formula Bk-4, respectively. Recording was carried out using these inks L to N and also using as an ink-jet recording apparatus the color ink-jet printer PIXEL-PRO (trade name: manufactured by Canon Inc.) with a heater element as an energy source for the ejection of ink, loaded with four-color inks. The recording was carried out on commercially available paper for copying, bond paper and ink-jet recording paper (having an ink-receiving layer) to evaluate the fixing performance of recorded characters, the feathering occurrence, the anti-clogging when printing is again started after a pause of printing, the anti-clogging when printing is again started after a long-term stop of printing, and the frequency response.

As a result, it was possible to carry out recording as in Examples 1 to 6 without any difficulties.

As described above, it is possible according to the ink of the present invention to achieve a good bubbling response to heat energy in high-frequency drive printing, and to carry out recording with a superior quality level and a good penetrability, causing no feathering even on a plain paper such as paper for copying, paper for reporting, notepaper or letter paper, commonly used in offices.

It is also possible according to the present invention to obtain an ink having a high safety even when used in offices and homes.

It is still also possible according to the present invention to carry out recording that may not cause clogging at the nozzles of a head for ink-jet recording and has a good reliability.

Employment of the ink according to the present invention makes it possible to provide an instrument having a high reliability.

We claim:

1. An ink comprising a recording agent and a liquid medium capable of dissolving or dispersing the recording agent, wherein said ink comprises from 0.1% to 10% by weight of a water-soluble dye, from 75% to 95% by weight of water and from 4% to 20% by weight of a mixture of 1,2,6-hexanetriol and an addition polymer of ethylene oxide, wherein said 1,2,6-hexanetriol and said addition polymer of ethylene oxide are mixed in a proportion of the former to the latter of 1:20 to 20:1 in weight ratio.

2. The ink according to claim 1, wherein said addition polymer of ethylene oxide is triethylene glycol or tetraethylene glycol.

3. The ink according to claim 1, wherein said water-soluble dye is C.I Food Black 2.

4. The ink according to claim 1, wherein said water-soluble dye is a dye of the Formula (I)

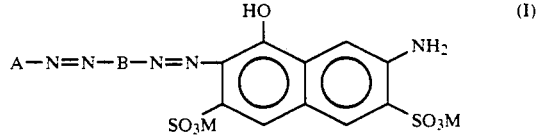

wherein A represents a lower alkylcarbonylamino group, a lower alkoxyl group, an $SO_3M$ group, a phenyl group substituted by a phenylazo group which may be substituted by an $SO_3M$ group, or a naphthyl group substituted by an $SO_3M$ group; B represents a naphthyl group substituted by an $SO_3M$ group or a phenyl group substituted by a lower alkoxyl group; and M represents an alkali metal or an ammonium group.

5. The ink according to claim 1, wherein said water-soluble dye is a dye of the Formula (II)

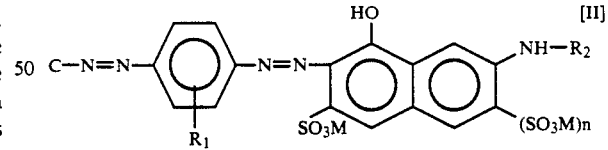

wherein C represents a naphthyl group substituted by an $SO_3M$ group, a phenylazo group which may be substituted by an $SO_3M$ group, or a phenyl group substituted by a lower alkyl group, a lower alkoxyl group or a lower alkylcarbonylamino group; $R_1$ represents a lower alkyl group, a lower alkoxyl group or a lower alkylcarbonylamino group; $R_2$ represents a hydrogen atom, or a phenyl group substituted by an $SO_3M$ group; n represents 0 to 1; and M represents an alkali metal or an ammonium group.

* * * * *

UNITED STATES PATENT AND TRADEMARK OFFICE
CERTIFICATE OF CORRECTION

PATENT NO. : 5,118,351                    Page 1 of 3
DATED      : June 2, 1992
INVENTOR(S): Shirota et al.

It is certified that error appears in the above-identified patent and that said Letters Patent is hereby corrected as shown below:

COLUMN 1:

Line 43, "type the" should read --type whereby the--.

COLUMN 2:

Line 25, "kind" should read --kinds--; and "ian" should read --in an--;

Line 35, "or," should read --are--; and (second occurrence)--.

Line 48, "ing under a high frequency the" should read --ing well under a high frequency to the--.

COLUMN 3:

Line 28, "Of" should read --of--; and

Line 32, "ere" should read --are--.

COLUMN 4:

Line 12, "kind" should read --kinds--;

Line 21, "than" should read --over--; and

Line 32, "that&" should read --that--.

UNITED STATES PATENT AND TRADEMARK OFFICE
CERTIFICATE OF CORRECTION

PATENT NO. : 5,118,351

DATED : June 2, 1992

INVENTOR(S) : Shirota et al.

It is certified that error appears in the above-identified patent and that said Letters Patent is hereby corrected as shown below:

COLUMN 5:

Line 42, "wherein represents" should read --wherein R represents--; and

Line 44, "an," should read --an--.

COLUMN 12:

Line 16, "is not" should read --it is not--; and

Line 58, "to" should read --into--.

COLUMN 13:

Line 9, "whereto" should read --thereto--;

Line 22, "to" should read --into--; and

Line 27, "to" should read --into--.

COLUMN 16:

Line 22, "o: re-printing after pause" should read --of reprinting after pause:--;

UNITED STATES PATENT AND TRADEMARK OFFICE
CERTIFICATE OF CORRECTION

PATENT NO. : 5,118,351

DATED : June 2, 1992

INVENTOR(S) : Shirota et al.

It is certified that error appears in the above-identified patent and that said Letters Patent is hereby corrected as shown below:

COLUMN 16:

Line 36, "can not" should read --cannot--; and
"mt" should read --at--; and

COLUMN 17:

Line 9, "12" should read --11--; and

Line 12, "Of" should read --of--.

Signed and Sealed this

Nineteenth Day of October, 1993

Attest:

BRUCE LEHMAN

Attesting Officer

Commissioner of Patents and Trademarks